Nov. 23, 1965   D. KLEIST ET AL   3,218,844
UNIFORMITY INDICATOR
Filed Jan. 23, 1962   2 Sheets-Sheet 1
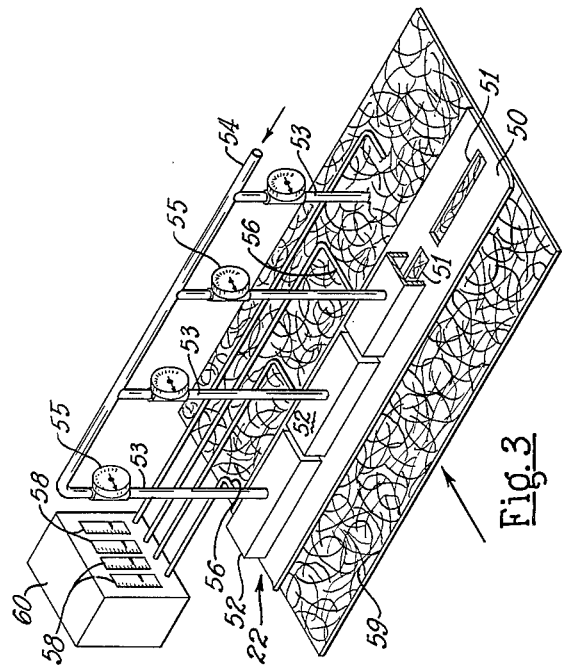
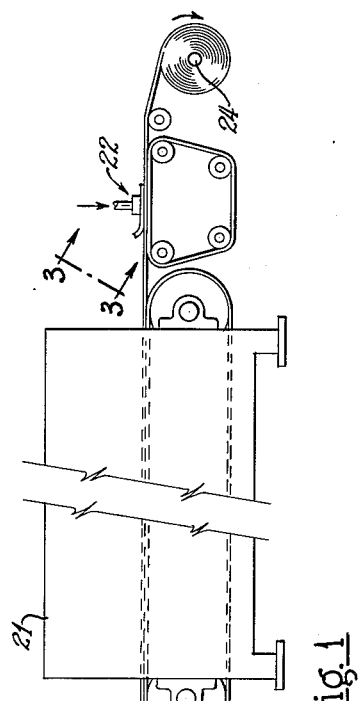
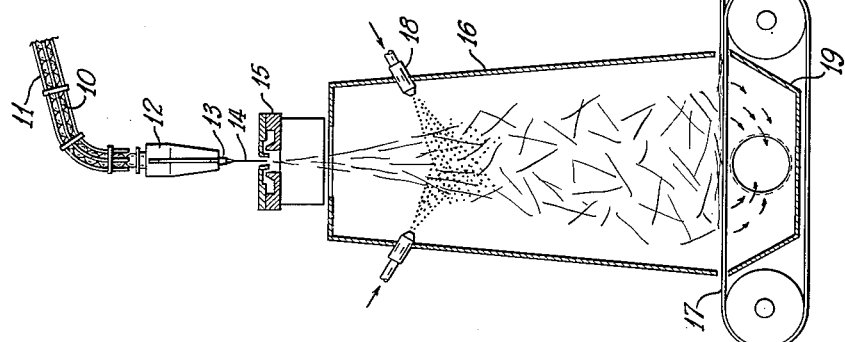
INVENTORS
DALE KLEIST &
BY JOHN M. HUMMEL
ATTORNEYS

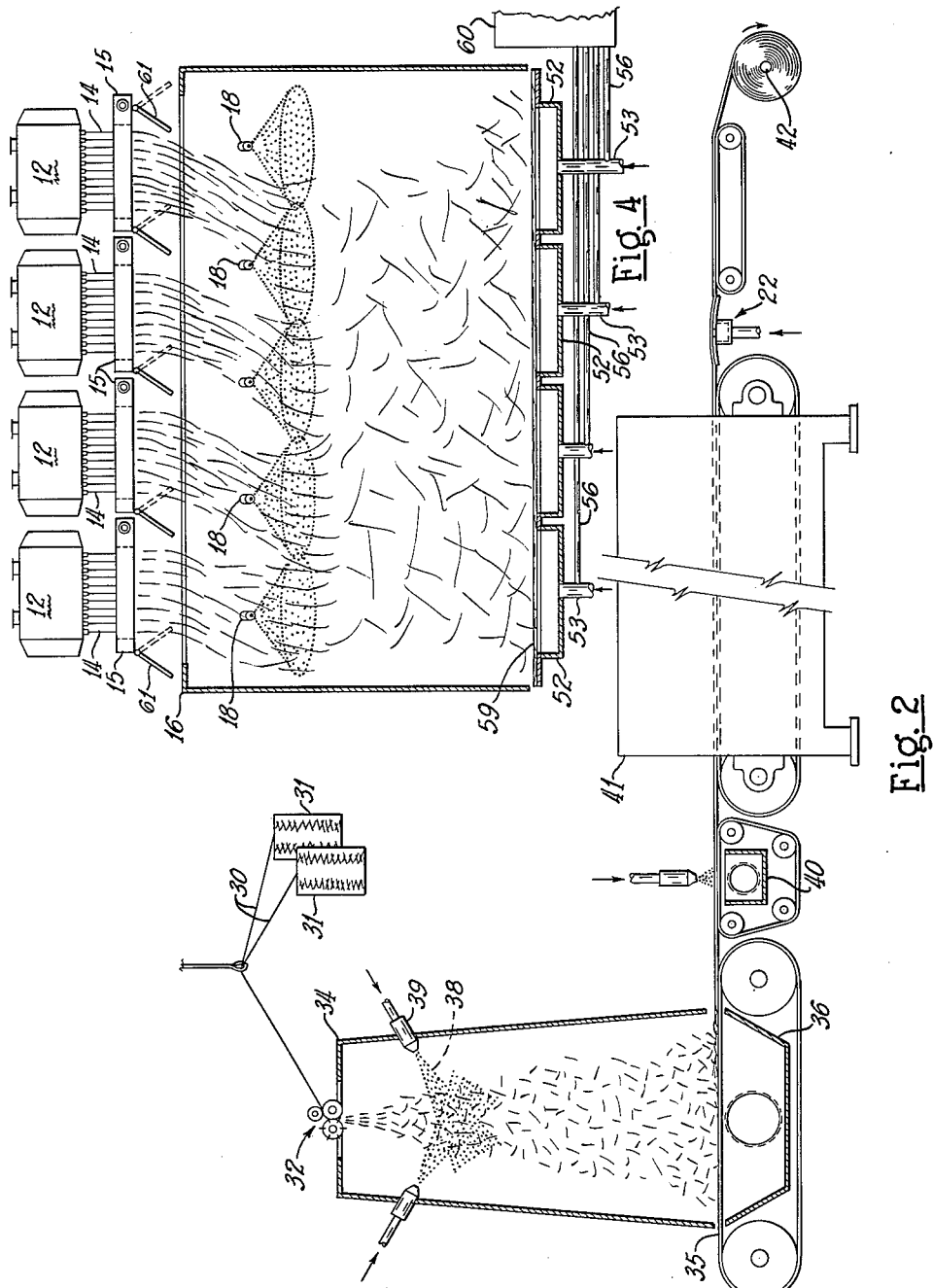

United States Patent Office 3,218,844
Patented Nov. 23, 1965

3,218,844
UNIFORMITY INDICATOR
Dale Kleist, l'Escale, Epalinges, Vaud, Switzerland, and John M. Hummel, Newark, Ohio, assignors to Owens-Corning Fiberglas Corporation, Toledo, Ohio, a corporation of Delaware
Filed Jan. 23, 1962, Ser. No. 168,041
1 Claim. (Cl. 73—37.5)

This invention relates to the production of thin fibrous mats and more particularly to a method and apparatus for continuously testing the thickness, weight, and uniformity of these mats both across and along their length.

This invention will be described in reference to the production and testing of thin mats from glass fibers although it will be understood that it is applicable to the production and testing of mats made from other fibers such as nylon, rayon, Dacron, asbestos, and many other natural or synthetic, and organic or inorganic fibers or mixtures thereof. Mats of fibrous glass are produced in a number of ways. One method comprises establishing a supply of molten glass in a feeder, flowing the glass as a plurality of streams through orifices in the bottom wall of the feeder and immediately engaging these molten streams by gaseous blasts from a suitable blower positioned thereat. These gaseous blasts attenuate the molten streams of glass into long thin fibers. The long thin fibers are collected as a rather thin veil on a fiber collecting conveyor positioned somewhat below the feeder where a suitable solution of a binding material is added to hold the filaments together. This thin wetted veil is carried by the collecting conveyor through a suitable curing oven where heated air is blown against and through it to polymerize and cure the binding material holding the fibers together. The bonded veil of fibers is generally collected by rolling it around a suitable mandrel.

Another type of fibrous glass mat that has been very successful commercially is produced by uilizing short lengths of strands of substantially continuous glass filaments. These strands are produced by first supplying the glass in a feeder in molten form. The molten glass flows as streams through orifices in the bottom wall of the feeder and is attenuated by a suitable collet into substantially continuous glass filaments. These continuous glass filaments are coated with a suitable protective bonding material and are collected together immediately above the collet into a continuous muti-filament strand. The strand is wound on a collecting tube surrounding the attenuating collet. The strands are fed from the collecting tube to a suitable cutter which severs them into short bundles of filaments (in the order of one to four inches long). These short lengths of the cut strands are fed into a collecting hood where a suitable additional binding material is added to adhere the short lengths of strands together and the short bundles of filaments are collected on a moving conveyor as a rather thin veil or mat. These and other types of fibrous glass mats are used for reinforcing various inorganic and organic materials such as gypsum and epoxy or polyester resins. In order to make optimum use of the glass fiber reinforcement, it is essential that this reinforcement be distributed uniformly throughout the reinforced matrix. This can best be accomplished by assuring that this reinforcing mat is uniform. Further, when these veils and mats are utilized as reinforcement for the surfacing layer of reinforced resinous articles, it is essential that they be very uniform to provide a suitable appearance as the resins reinforced are often somewhat transparent and any non-uniformity in the surfacing mat will be visible in the completed article. In addition, the unreinforced portion will be weaker and more susceptible to crazing and cracking. A determination of the thickness and uniformity of these thin veils or mats is very difficult because only a small change in amount of glass therein will effect a relatively large change in the thickness of the mat.

An object of this invention is to provide an improved process for continuously determining the uniformity of a thin veil of fibers.

A further object of this invention is to detect changes in the thickness of a thin veil of fibers.

A further object of this invention is to provide an indicator which will indicate the thickness profile across the width of a veil of fibers.

A further object of this invention is to provide a method for accurately comparing the density of one area of the mat against another without interrupting the mat forming process.

A still further object of this invention is to provide a means for indicating when the thickness of a given section of the fibrous veil is different by a predetermined amount from the standard or nominal density.

Another object of this invention is to provide a process and apparatus for measuring the thickness of a rather thin veil of fibers.

Other objects and advantages of this invention will become apparent from the description which follows, reference being had to the accompanying drawings in which:

FIGURE 1 is a general elevational view of a process for producing a veil of bonded glass filaments utilizing the indicating mechanism of this invention.

FIGURE 2 illustrates a process for producing a thin bonded veil of short lengths of fibrous glass strands incorporating the indicator of this invention.

FIGURE 3 is a front view on an enlarged scale of the indicating mechanism of FIGURE 1 illustrating the apparatus associated therewith.

FIGURE 4 is an end view of a process for producing a bonded veil of fibers more clearly illustrating the relationship between the collection of the fibers and the indicating mechanism of this invention.

As illustrated in FIGURE 1 of the attached drawings, cold glass marbles 10 are supplied through a suitable conduit 11 to a feeder 12. The marbles of glass are melted in the feeder and the molten glass flows as streams 14 through a plurality of orifices 13 in the bottom wall of the feeder 12. The streams of molten glass from the feeder are grasped by blasts of steam from suitable blowers 15 positioned adjacent thereto. The blasts of stream attenuate the streams of glass into long fine filaments. These filaments are sprayed with a suitable binding material from spray guns 18 mounted in the sidewalls of the fiber collecting hood 16. The freshly attenuated filaments with binder thereon are collected as a thin veil on a fiber collecting conveyor 17. Air from inside the fiber collecting hood is drawn downward through the fiber collecting conveyor 17 into a suction box 19. This flow of air aids the uniform deposition of the fibers onto the fiber collecting chain. The veil of fibers is transported from the collecting zone to a dip tank 20 where additional binding material is applied to it. Immediately after passing through the dip tank the mat is carried over a suction box 24 and excess binding material is removed by air rushing through the veil and into the suction box. After passing over the suction box the mat with the wet binder is fed through a curing oven 21 wherein hot gases are forced through the veil to cure the binding material and hold the fibers in place. If desired, an additional oven for dielectric curing of the binder on the mat can be placed adjacent the exit from the hot air curing oven. If the binder is completely cured in the hot air oven, the dielectric oven will not affect it because of its rather low dielectric constant. However, if all of the water is not removed from a section of the mat, the dielectric oven will heat up only that section and cure the binder thereat because of the rather high dielectric constant of the water. The thickness and uniformity tester 22 of this invention is positioned immediately beyond the exit from the curing oven. It indicates the thickness of each section of the veil and irregularities therein can be corrected by the operator as discussed below. The finished veil of fibers is then collected by wrapping it around a collecting mandrel 24.

This thickness and uniformity tester can also be used in the production of a mat from short lengths of strands as illustrated in FIGURE 2. Continuous strands 30 of glass filaments are drawn from suitable supply rolls 31. The continuous strands are supplied to a cutter 32 that severs them into short lengths. The short lengths of fibers are dropped into the upper zone of a collecting hood 34. They fall through the collecting hood and are collected as a thin veil or mat on a collecting conveyor 35. Air is drawn into a suction box 36 from the collecting hood 34 through the collecting conveyor 35. This downward flow of air within the collecting hood aids the uniform deposition of the short lengths of strands on the collecting conveyor. A suitable binding material 38 is sprayed onto the collected lengths of strands from spray guns 39 and excess binding material is removed from the collected veil by a suction box 40. Additional binding material may be applied by spraying it from a suitable supply gun positioned above the suction box. The binding material is cured in a curing oven 41 by forcing heated gases through the veil. After passing through the curing oven the bonded veil of fibers passes over the uniformity and thickness indicator 22 and is collected by rolling it around a mandrel 42.

As illustrated in FIGURE 3, the uniformity and thickness indicator of this invention utilizes a face plate 50 having a curved leading edge and a plurality of elongated openings 51 extending almost completely across its width. Each of said openings is connected to an independent plenum chamber 52. Gases are supplied under pressure to each of said plenum chambers through conduits 53 from a common supply line 54. Regulators 55 are inserted in each of the supply conduits 53 to maintain the flow of a constant volume of gases through said supply conduits. Pressure taps 56 are attached to said conduits adjacent said plenum chambers for sensing the pressure of said gases in that zone of said conduit. Each of these pressure sensing taps is connected to a suitable manometer or dial 58 that provides a visual indication of the pressure in that area of the conduit. All of the dials 58 can be mounted in a suitable cabinet 60 thereby readily providing a visual indication of the profile in thickness of the veil of fibers. This cabinet may be positioned at a convenient location and is often positioned near the feeders 12 so that it can be readily observed by the machine operators who are responsible for the production of uniform bonded veil. The veil 59 of bonded fibers passes adjacent the surface of the face plate 50 and partially blocks the elongated openings 51 in the face plate. In all sections of the veil the fibers will be of approximately the same average diameter. Thus the porosity and the resistance to the escape of gases from a plenum chamber will depend to a large extent upon the thickness of the section of the veil partially blocking the opening from that plenum chamber. Thus the readings of all of the pressure gauges 58 will be the same if the bonded veil is uniform across its width and the readings will remain constant if the bonded veil is uniform along its length. The face plate 50 is constructed with all of the openings 51 having the same dimensions so that differences in the apparent porosity (generally controlled by thickness) of the veil will be reflected as either an increase or decrease in the pressure within the plenum chamber 52 and the conduit 53. A decrease in the thickness of the veil will result in its being more porous and having decreased resistance to the flow of gases from the plenum chamber. Thus the pressure of the gases within the plenum chamber and supply conduit will decrease. Conversely, an increase in thickness of the veil will result in an increase in the pressure in the plenum chamber and conduit.

As shown in FIGURE 4, the molten glass 14 flows as streams from a plurality of feeders 12 spaced above the collecting conveyor and across its width. The molten streams of glass 14 are attenuated into fine fibers by blasts of steam from the blowers 15. A plurality of moving metal blades 61 extend below the blower and aid in distributing the fibers evenly across the collecting conveyor as described in U.S. Patent 2,653,416. The position of these blades as well as the amplitude and frequency of their oscillations is regulated to direct the fibers from each feeder to the desired position on the collecting conveyor thereby providing a uniform distribution of the filaments on the collecting conveyor. The thickness of the veil is controlled by changing the speed of the collecting conveyor and the number of feeders being operated. The indicator of this invention will show any variations in thickness across the width of the veil and the men operating the forming section of the machine correct these variations so that a veil of uniform thickness is produced. The changes are made by adjusting the spacing and movement of the blades 61 to direct more fibers to the deficient sections.

It is apparent from the foregoing that while particular embodiments of the present invention have been shown and described, changes and modifications may be made without departure from this invention as the present disclosure is illustrative merely, the invention comprehending all variations thereof.

We claim:

Apparatus for determining the thickness of an air permeable material, said apparatus comprising:
- a face plate of generally elongate planar configuration, adapted to transversely span said material in substantially face-to-face relationship,
- said plate having a plurality of elongated openings in substantially end-to-end spaced alignment,
- means defining an essentially confined chamber for each of said openings, said chambers each being mounted over one of said openings on the side of said plate opposite the one adapted for face-to-face relationship with said material,
- means for independently supplying a stream of a gas to each of said chambers at a constant rate and a pressure greater than atmospheric and
- independent means for measuring the pressure in each of said streams.

References Cited by the Examiner

UNITED STATES PATENTS

| | | | |
|---|---|---|---|
| 1,599,964 | 9/1926 | Haven | 73—38 |
| 2,552,189 | 5/1951 | Kuehui | 73—37.7 X |
| 2,694,911 | 11/1959 | Peck | 73—37.7 |
| 3,115,037 | 12/1963 | Forrester | 73—37.7 X |

FOREIGN PATENTS

| | | |
|---|---|---|
| 171,811 | 6/1960 | Sweden. |
| 819,918 | 9/1959 | Great Britain. |

ISAAC LISANN, *Primary Examiner.*

ROBERT L. EVANS, *Examiner.*